United States Patent [19]

Suroff

[11] Patent Number: 4,609,826
[45] Date of Patent: Sep. 2, 1986

[54] ENERGY EFFICIENT APPARATUS

[76] Inventor: Hyman Suroff, 6813 21st Ave., Brooklyn, N.Y. 11204

[21] Appl. No.: 725,559

[22] Filed: Apr. 22, 1985

[51] Int. Cl.⁴ .............................................. F03G 7/04
[52] U.S. Cl. .................................... 290/1 R; 290/43; 415/7
[58] Field of Search ................... 290/1, 43, 54; 415/7, 415/12; 416/84

[56] References Cited

U.S. PATENT DOCUMENTS 3,366,865  1/1968  Shapiro ........................... 290/1 R X
4,471,613  9/1984  Lang ..................................... 415/7 X Primary Examiner—William M. Shoop, Jr.
Assistant Examiner—W. E. Duncanson, Jr.
Attorney, Agent, or Firm—Leonard W. Suroff; Martin Sachs

[57] ABSTRACT

An energy efficient apparatus suitable for use in hot, arid climates wherein a source of water is available includes in combination; a rotating wheel member which utilizes the buoyancy of outwardly extending members and a pair of temperature sensitive devices responsive to the change in ambient temperature to cause the moment about the axis of the rotating wheel member to increase, thereby aiding in the rotation of the rotating wheel member providing continuous output energy. The increase of the mechanical moment is caused by the mechanical change in position of an outwardly extending member and provides a portion of the energy obtained thereby to a spring and escapement mechanism which further couples additional energy to support the rotation of the rotating wheel member.

8 Claims, 7 Drawing Figures

ENERGY EFFICIENT APPARATUS

BACKGROUND OF THE INVENTION

1. Field of the Invention

The present invention relates to prime sources of energy and, in particular, relates to an energy efficient apparatus that uses the surrounding elements to provide continuous output energy which may be stored and then used at a later time to drive a plurality of different output mechanisms.

2. Discussion of the Relevant Art

The art abounds with energy efficient devices, all of which attempt to utilize natural sources of energy in order to aid in the generation of power for commercial use. Some of these devices utilize the flow of water such as occurring in waterfalls, and rivers or may utilize the natural elements such as the wind and sun to provide sources of energy. These devices have generally met with various degrees of success and are suitable for many applications wherein a continuous energy source is not required. The energy obtained from the natural sources, as is well known in the art, may be stored in batteries, underground heat reservoirs and may also include potential energy obtained by raising water to a level above that at which it is to be used and recovering this energy by permitting the water to flow to the lower level when needed.

The present device overcomes many of the shortcomings found in the prior art devices by providing a device capable of using a plurality of the natural elements that occur in a hot, arid climate wherein a source of water is available. The combination thereof being capable of providing a source of continuous energy, which may be stored, as is well known in the art, for future use.

Therefore, it is an object of the present invention to provide a reliable, relatively inexpensive source of energy which utilizes the surrounding elements to generate same.

It is another object of the present invention to provide a reliable, efficient source of energy that is ideally suitable for use in hot, arid climates where a source of water is available.

Still another object of the present invention is to provide a relatively simple apparatus capable of using the surrounding elements for generating a continuous source of energy.

It is still yet another object of the invention to provide a relatively inexpensive efficient apparatus which may be installed by relatively inexperienced personnel.

The foregoing and other objects of advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

An energy efficient apparatus suitable for use in hot, arid climates wherein a source of water is available, according to the principals of the present invention, comprises in combination; a wheel member having a hub portion and a rim portion. The wheel portion is submerged within the water to a depth sufficient to more than immerse the wheel member hub portion. The wheel member has a plurality of spokes equally disposed about the circumference of the hub portion between the hub portion and the rim portion. The rim portion includes a hollow generally round shaped member open at one end. The hollow member is substantially rigid, buoyant and selected to displace more water than its weight. A temperature sensitive expansion device is affixed to the closed end of the hollow member. A temperature sensitive displacement device is disposed within the temperature sensitive expansion device and has the ability to move between only two stable positions responsive to a change in ambient temperature. The spoke device includes a hollow shaft member affixed on one end to the hub portion and affixed on the other end to the temperature sensitive expansion device. A solid rod member is disposed within the hollow shaft member and affixed on one end to the temperature sensitive device. The other end of the solid rod member extends into the hub portion. The hub portion includes a fixed shaft and escapement and spring device, with the spring connected to the escapement gear and the other end thereof operatively coupled to the hub for causing the escapement gear to transfer the movement of the second temperature sensitive device to the spring device. The energy stored in the spring device is transferred to the hub portion in a direction to maintain the wheel member rotating. An energy takeoff apparatus is disposed upon the hub portion and is operatively coupled to a utilization apparatus which may directly provide energy such as electricity or be coupled to an apparatus which moves water to a higher level therefore providing a source of potential energy which may be recovered at a later time.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
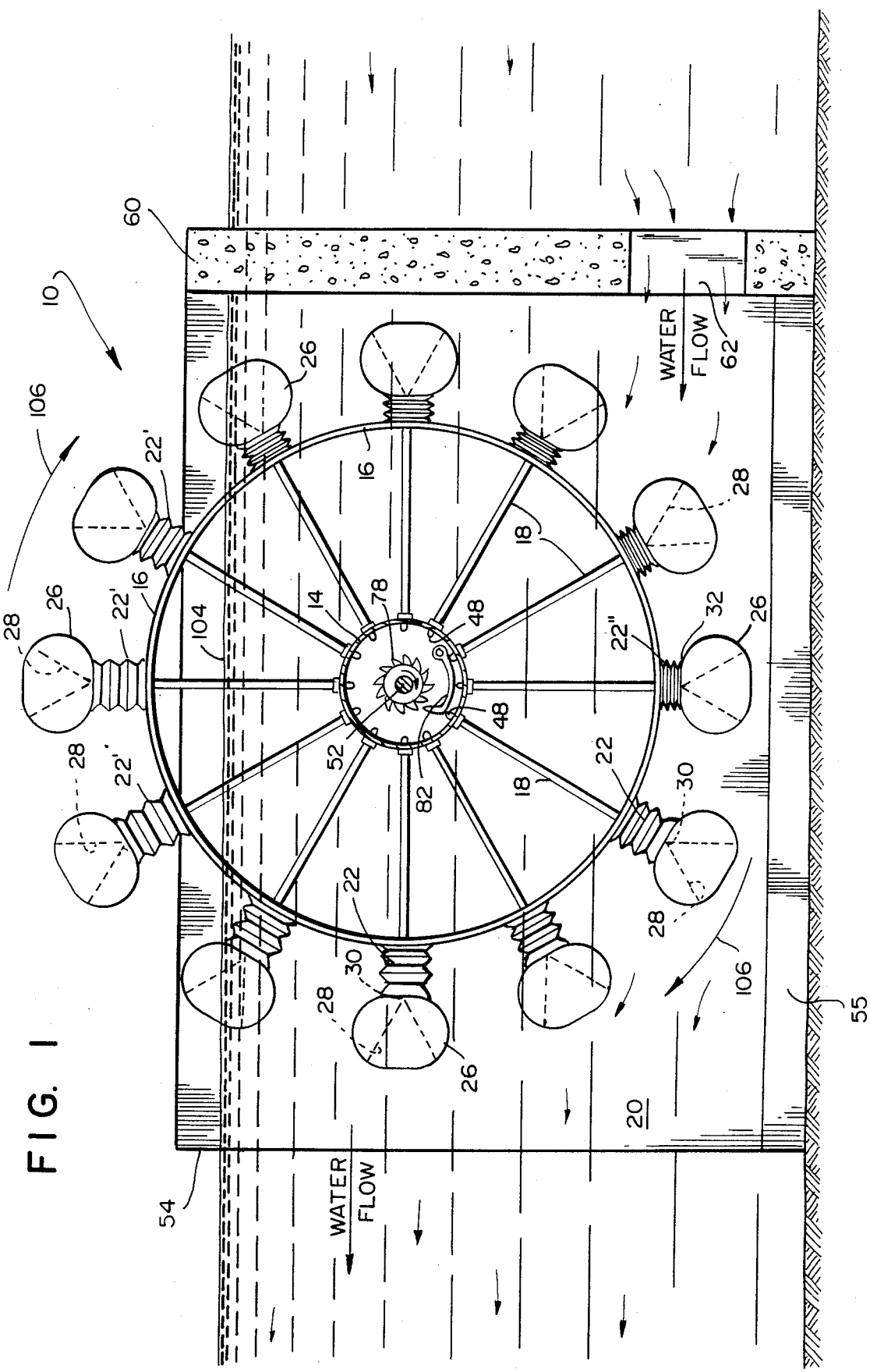
FIG. 1 is a pictorial representation, in elevation, of the preferred embodiment, according to the principles of present invention.
Figure 2:
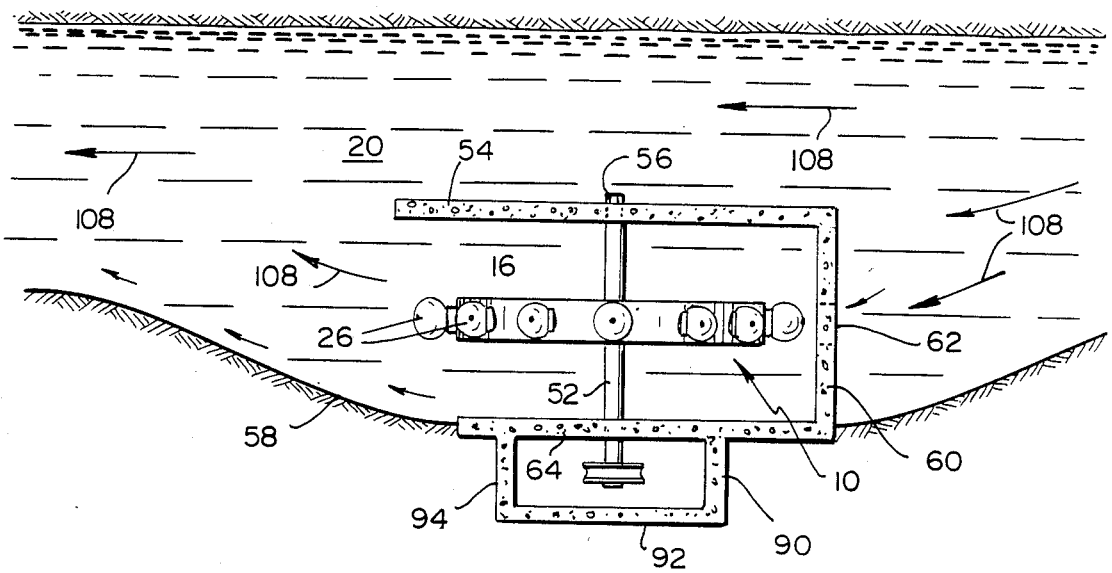
FIG. 2 is a top plan view of the embodiment disclosed in FIG. 1, with a preferred location of the apparatus in a stream of water.

Referring now to the figures, and in particular to FIGS. 1 and 2, in which there is shown an energy efficient apparatus 10 which includes a wheel member 12 that is provided with a hub portion 14 and a rim portion 16 with a plurality of spokes 18 disposed between the hub portion 14 and the rim portion 16 equally spaced and rigidly affixed about the circumference of the hub portion 14. The wheel member 12 is preferably submerged within a body of water 20 to a depth sufficient to more than immerse the hub portion 14 of wheel member 10 beneath the level of the water at all times. The rim portion 16 positioned at the distal end of the plurality of spokes includes an expansible temperature sensitive apparatus 22 which is affixed to each of the spokes in exactly the same manner as the other end thereof is affixed to the hub portion 14.

Figure 3:
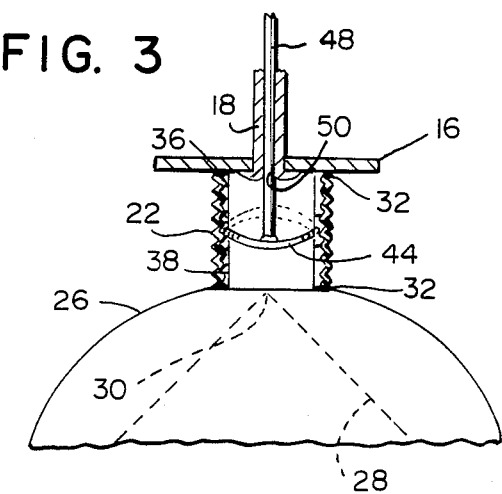
FIG. 3 is a partial view in elevation of the expandable temperature sensitive device with the two position temperature sensitive device disposed therein at its hottest temperature.
Figure 4:
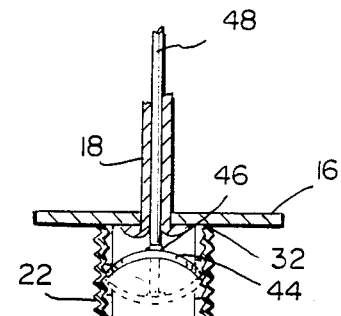
FIG. 4 is a partial view in elevation of the expandable temperature sensitive device with the two position temperature sensitive device disposed therein at its coldest temperature.
Figure 5:
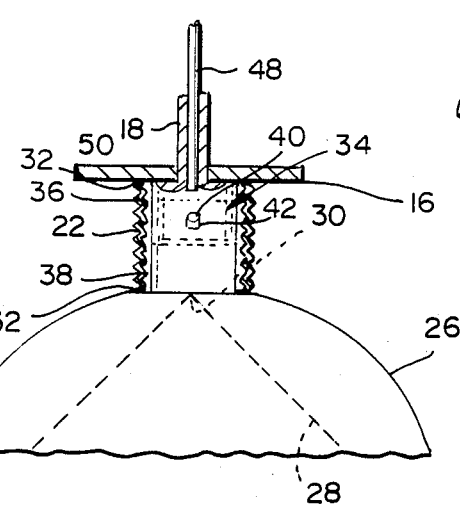
FIG. 5 is a partial end view of the apparatus as disposed in FIGS. 3 and 4.

The temperature expansible device 22 is cylindrically-shaped with accordion type walls that readily expands with increasing temperature and has affixed to one end thereof the spoke 18 which extends through an opening 24 provided in the rim portion 16 of the wheel member 12 and is shown more clearly in FIGS. 3 through 5. The other end of the expansible temperature sensitive device 22 has affixed thereon, in a conventional manner, a hollow generally round shaped member 26 which preferably is rigid, buoyant and is selected to displace more water than its weight. The hollow opening 28 is generally cone shaped and preferably has the apex thereof 30 closest to the temperature sensitive expansible device 22 so that the water 20 may readily fill the cone shaped opening upon the submergence thereof into the water 20 and is capable of readily permitting the water 20 to flow therefrom upon exiting the surface of the water, which will be explained in more detail hereinafter. Preferably the round shaped member 26 may be made from a synthetic material such as polypropylene or polyethylene.

The temperature sensitive expansible device 22 has one end 30 affixed upon the rim 16 in a conventional manner such as welding, soldering, or any other suitable means that is capable of providing a watertight seal between the expansible device 22 and the rim 16 with a similar watertight seal provided between the round shaped member 26 where, of course, the seal is accomplished with an epoxy or adhesive 32, known by those knowledgeable in the art.

Disposed within the expandable temperature sensitive device 22 are a pair of telescoping brackets 34 each preferably being made of two members 36 and 38. Member 36 includes an outwardly extending protrusion 40 adapted to cooperate with a slot 42 provided in member 38 permitting movement (sliding) between the two members 36 and 38 of (pair 34), thus providing a support for the temperature sensitive expandable device 22 when caused to move in an outwardly or expanding direction. A second temperature sensitive member 44, preferably circularly-shaped has its circumference affixed to members 38 of bracket pair 34. If the distal ends of temperature sensitive member 44, affixed to members 38, move in an outwardly direction movement is permitted between members 36 and 38 as required. Temperature sensitive member 44 has two stable states or positions dependent upon or responsive to the ambient temperature into which the temperature sensitive member is placed. A typical temperature sensitive device of this nature suitable for operation herein is a bimetallic temperature device manufactured by Klixon a division of Texas Instruments, Inc. This device has a fixed stable position at one temperature and snaps or moves to another position when the surrounding ambient reaches the trip temperature point. The central portion 46 of temperature sensitive member 44 is affixed to a preferably solid rod member 48 and extends completely through the opening 50 provided in the spoke 18 extending into the hub portion 14 of the wheel member 12 and is lubricated to move freely within spoke 18. Thus, when the temperature sensitive member 44 changes from its hot position, shown in FIG. 3, to its cold position, shown in FIG. 4 and FIG. 5, the rod member is free to move causing displacemeht of the expansible temperature sensitive device 22 as well as the round shaped member 26.

The hub portion 14 includes a fixed shaft 52 which is retained in wall portion 54 in a conventional manner by a nut 56. Wall portion 54 is preferably fabricated of concrete and as shown in FIG. 2 and positioned as shown in a flowing stream of water 20, if available. If a flowing stream were not available then wall portion 54 would be disposed a short distance from the shoreline 58. The deflecting wall portion 60 is provided with an opening, preferably consisting of an elongated rectangularly shaped aperture 62 positioned to permit water flow therethrough at the level of the round shaped member 26 so that any water flowing would act in a direction to continuously sustain the rotation of wheel member 12. If, no moving water is available, then there would be no need for a deflecting wall portion 60. A second wall portion 64 has the other end of shaft 52 retained therein in a manner similar to that for the retention of the first end of said shaft. A pair of ball bearings 66 and 68 are placed proximate the ends of shaft 52 and is utilized to provide journaling of hollow hub portion 14 therearound. Ball bearings 66 and 68 provide for easy rotation of hub portion 14 around shaft 52 and is positioned in wall members 54 and 64 for better journaling therearound. An output takeoff pulley 70 is provided on one end 72 of hub portion 14 and may be coupled to an energy utilization source such as an electric generator 74 shown in FIG. 7 by means of a belt 76 coupled to the pulley 70, in a conventional manner. Other energy utilization devices may be coupled to the output pulley 70, as for example, a device for lifting the water directly out of the river or lake for irrigation purposes may also be coupled to this source of output power, by those knowledgeable in the art.

Journalled on output shaft 52 is an escapement gear 78 that is provided with a plurality of teeth and a locking mechanism the conventional, type for preventing the escapement gear from rotating in the wrong direction and losing the energy imparted to it by rotation. Energy imparting lever 82 is pivoted about shaft 52, in a conventional manner, and is adapted to cooperate with the teeth provided on escapement gear 78 and when striking the teeth causes rotation of the escapement gear. Affixed to the side wall of escapement gear 78 is coil a spring 84 which is caused to tighten as the escapement gear 78 rotates. Spring 84 releases the energy stored therein by having its other end connected, in a conventional manner by means of a rivet or screw 86, to the hub portion 14. Thus, when the escapement gear 78 stops rotating or pauses spring 84 transfers the energy stored therein to hub portion 14 to maintain its rotation. The force to drive the energy lever 82 into contact with the teeth of the escapement gear 78 is obtained from the rod member 48 being moved within the hollow spokes 18. The movement thereof is obtained by the sudden flexing of the temperature sensitive member 44 as explained earlier.

The sudden movement of temperature sensitive member 44 causes both the rod member 48 to move in an upwardly direction at the same time, causing an impact of the lever 82 with the escapement gear 78, thereby causing telescoping members 36 and 38 to move apart and move the round shaped member 26 in an outwardly or downwardly direction (further away from the centrally disposed fixed shaft 52). Thus, the movement of round shaped member 26 caused by the expansion of temperature sensitive expansible device 22 and/or temperature sensitive member 44 causes movement of member 26 either closer to or further from shaft 52 varying the moment of force therearound.

As shown in FIG. 2 the output or power takeoff pulley extends into an additional compartment formed by walls 90, 92, and 94 and may included therein any type of energy utilizing device, as for example, the electrical generator 74 described earlier. The volume formed by walls 90, 92 and 94 is free of water and may contain generator equipment as described earlier or alternatively may include a device for lifting water therefrom and moving it to another area for irrigation purposes. The pulley is only one example of an output device and only one example of a device for utilizing the rotating output hub 14 having pulley 70 affixed thereon.

Figure 7:
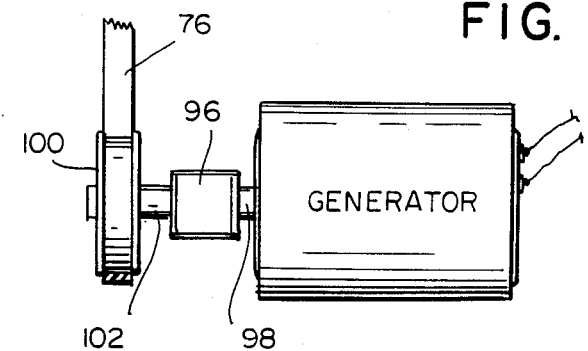
FIG. 7 is a pictorial representation of an example of an energy utilization device which may be coupled by a pulley to the output shaft of the apparatus disclosed in FIG. 1.

Of course, as shown in FIG. 7, a gear box 96 can be included and affixed on shaft 98. On the other end of gear box 96 a shaft 102 may have affixed thereon a pulley 100 adapted to receive a belt 76 which in turn, as stated earlier, is operatively coupled to output pulley 70. Thus, the energy appearing on output pulley 70 may be coupled in any number of ways by varying the ratio of pulley sizes, changing the gear box, etc. Any number of means for utilizing this available source of energy exists, only one of which may be an electrical generator. Those knowledgeable in the art are aware of any number of energy utilizing devices that may be coupled to the rotating hub 14.

Figure 6:
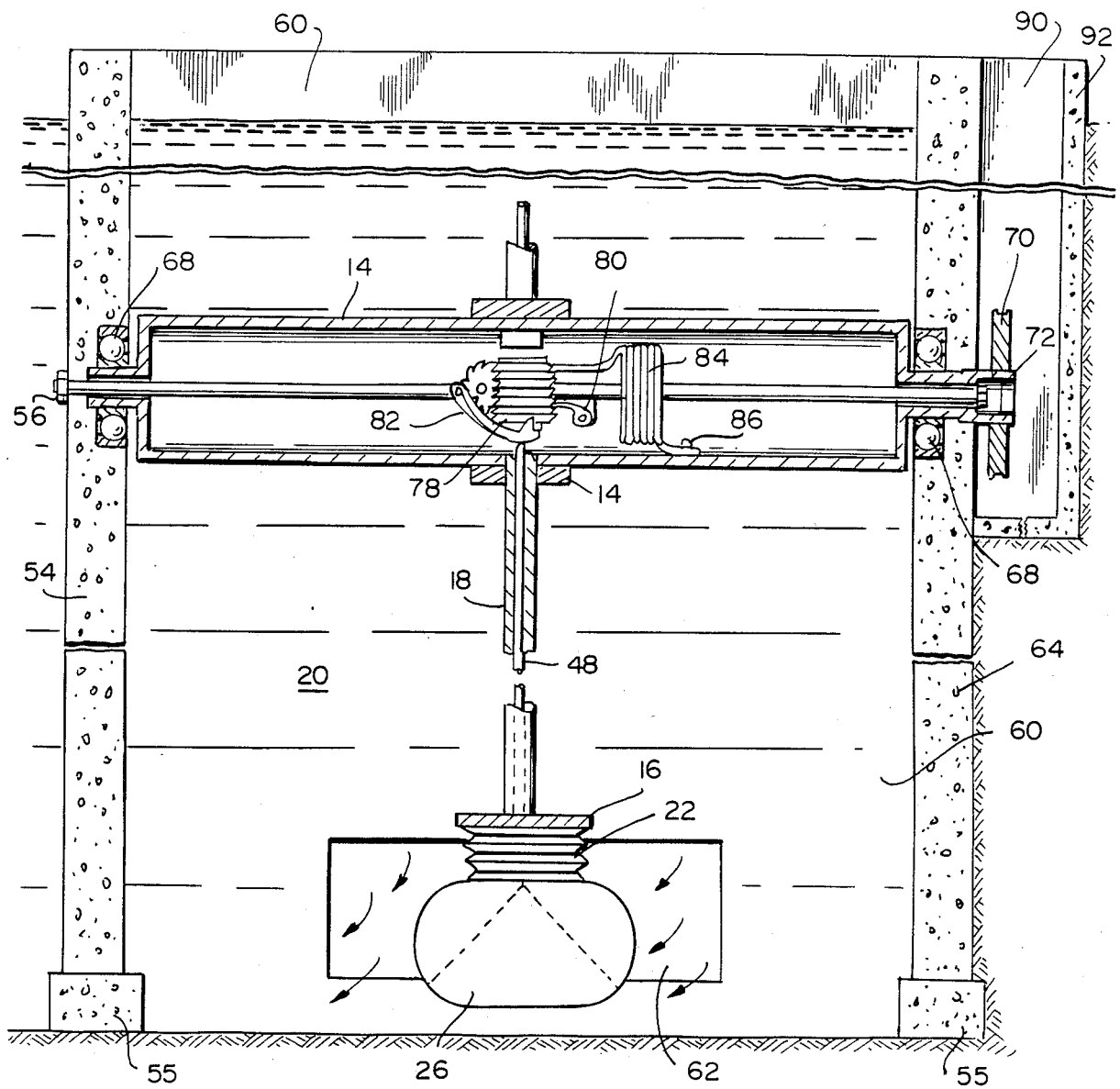
FIG. 6 is a partial view in elevation of the apparatus shown in FIG. 1, with the hub portion enlarged and the apparatus positioned within a protective barrier as shown in FIG. 2.

As shown in FIG. 6 the walls 54 and 64 are provided with a footing 55 extending into the bottom of the water so that the walls are capable of being maintained in position for a long period of time.

In operation, once the apparatus is installed in position its continued rotation relies on multiple sources of natural energy for operation. Initially the device is subjected to direct sunlight. The sun causes the temperature of the round members 26, extending above the water level, to expand and evaporate any water appearing in the aperture 28. Expansion of the temperature expansible device shown as 22' would increase as it moves directly out of the water to the central position until just before it reaches the water surface 104. The moment temperature expansible device 22 enters the water it begins to cool and tends to compress just as an accordion compresses. The temperature sensitive member 44 disposed within the expansible temperature member 22 assumes the position shown in FIG. 3, since it is in its hottest (high temperature) position and of course cools during the time it is immersed in the water, which occurs gradually. As the expansible member 22 tends to cool it shrinks in size, therefore moving the round shaped member 26 closer to the central shaft 52. Upon entering the water round shaped member 26 takes on water and increases its mass and further helps the wheel member to rotate as the members 26 slowly sink into the water and cool when they approach the lowest position shown as 22" where the temperature expansible device has decreased to its smallest size. With a delay occurring as member 26 stays at its deepest or lowermost position. The water temperature being cooler at that depth, as is well known, the temperature sensitive member 44 changes its state from its position in FIG. 3 to its position in FIG. 4. The sudden change in position causes the shaft 48 to move in an upwardly direction wherein the other end of shaft 48 comes into contact with the energy lever 82 causing movement thereof wherein lever 82 strikes the teeth of escapement gear 78 imparting energy thereto. At the same moment round member 26 is caused to move in the opposite direction away from central shaft 52, since the telescoping members 36 and 38 are permitted to move in an outwardly direction. The shape of opening 28 permits the output thrust caused by the instantaneous change in state of temperature sensitive member 44 to meet sufficient resistance to impart the necessary energy to energy lever 82 at the same time moving round member 26 in an outwardly direction. Spring 84 helps move the hub portion 14 in a direction to continue movement of round member 26 which it moves downwardly with its temperature expansible device 22 while rod member 48 in an upward direction. A continuing rotational motion occurs since the floatation forces of round members 26 are the same on both sides of center shaft 52 but with spoke 18 now effectively being elongated (26 being further away from the center of shaft 52) a moment around shaft 52 is increased on the left side of the diagram shown in FIG. 1 causing rotation in the direction of arrows 106 which continues with the expansible temperature device 22 tending to expand as the water temperature increases as the surface of the water 104 is approached. As the surface of the water is approached, the water retained an opening 26' tends to exit from the opening reducing the weight thereof and flotation on that side (upward forces) further increases the moment in the direction of arrows 106. Thus energy is obtained by the increased moment caused by the displacement of round member 26 from the center shaft 52 and the additional energy imparted by spring 84. As the round member 26 leaves the surface of the water the sun causes evaporation of the remaining water making it easier for the round portion to be raised to its peak position and thus be heated to the ambient temperature by the sun's rays. The heating of course of the expansible member causes expansion and as the temperature rises the temperature sensitive member 44 suddenly changes its state to that shown in FIG. 3 and the cycle is repeated again and again.

If a moving body of water were available then the configuration as disclosed could be aided by placing the energy efficient apparatus 10 into the stream wherein the water flow indicated by arrows 108 is arranged to flow as indicated in FIG. 2 with the aperture 62 provided in wall 60 providing a controlled flow that aids in the direction of rotation, thus reinforcing the other energy inputs to the system.

Of course, although only one type of energy output device has been shown, it is to be expected that those knowledgeable in the art can come up with any number of different ways of utilizing the relatively inexpensive energy provided by the energy efficient apparatus disclosed herein.

Hereinbefore has been disclosed an energy efficient apparatus suitable for use in climates that are hot and arid where a source of water is available. It will be understood that various changes in the details, materials, arrangements of parts and operating conditions which have been herein described and illustrated in order to explain the nature of the invention may be made by those skilled in the art within the principles and scope of the instant invention.

Having thus set forth the nature of the invention, what is claimed is:

1. An energy efficient apparatus suitable for use in hot arid climates wherein a source of water is available, comprising in combination:
    (A) a wheel member having a hub portion and a rim portion, said wheel portion being submerged within said water to a depth sufficient to more than immerse said wheel member hub portion, said wheel member having a plurality of spoke means equally disposed of about the circumference of said hub portion disposed between said hub portion and said rim portion, said rim portion including;
        (i) a hollow generally round shaped member being open at one end, said hollow member being substantially rigid, buoyant and displacing more water than its weight,
        (ii) first temperature sensitive means being expansible and affixed to the closed end of said hollow member, and
        (iii) second temperature sensitive means being disposed within said first temperature sensitive means, said second temperature sensitive means having the ability to move only between two stable positions responsive to a change in ambient temperature;
    said spoke means, including;
        (i) a hollow shaft member affixed on one end to said hub portion and affixed on the other end to said first temperature sensitive means, and
        (ii) a solid rod member disposed within said hollow shaft member affixed on one end to said second temperature sensitive means, the other end of said solid rod member extending into said hub portion;
    said hub portion being hollow and including;
        (i) fixed shaft means centrally disposed within said hollow hub portion,
        (ii) escapement gear means operatively coupled to the other end of said solid rod member for driving said escapement gear means, transferring the movement of said second temperature sensitive means to said escapement gear means,
        (iii) spring means connected between said hub portion and said escapement gear means for transferring the energy stored in said spring means, from the displacement of said solid rod means driving said escapement gear means, to said hub portion in a direction to maintain said wheel member rotating, and
        (iv) energy takeoff means disposed upon said hub portion; and
    (B) energy utilization means operatively coupled to said energy takeoff means for providing a useable source of energy.

2. An energy efficient apparatus according to claim 1 wherein said useable source of energy is an electrical generator operatively coupled to said energy takeoff means.

3. An energy efficient apparatus according to claim 2 wherein said utilization means includes a device for raising water to a higher level than normal to obtain a source of potential energy for later utilization.

4. An energy efficient apparatus according to claim 3 wherein said utilization means includes a water pump.

5. An energy efficient apparatus according to claim 1 wherein said round shaped member has a hollow inner chamber formed to expel essentially all of its contents upon leaving said water.

6. An energy efficient apparatus according to claim 1 wherein said round shaped member has a hollow inner chamber formed to receive a maximum amount of water upon entering said water.

7. An energy efficient apparatus according to claim 1 wherein said first temperature sensitive expansion means includes a pair of telescoping side members, said second temperature sensitive means being disposed between said pair of telescoping side members, the center portion of said temperature sensitive means moving between a first position when at a relatively hot temperature and a second position when at a relatively cold temperature, said first temperature sensitive expansion means being urged to an expanded position when said second temperature sensitive means is in said second position, one end of said solid rod member being affixed to said center portion of said temperature sensitive means.

8. An energy efficient apparatus according to claim 1 when said first temperature sensitive expansion means is hollow, cylindrically-shaped and has an expansible circumferential surface.

* * * * *